United States Patent [19]

Jäger et al.

[11] Patent Number: 4,621,138
[45] Date of Patent: Nov. 4, 1986

[54] TRIPHENDIOXAZINE DYESTUFFS

[75] Inventors: Horst Jäger, Leverkusen; Klaus Langheinrich, Bergisch-Gladbach; Karl-Josef Herd, Odenthal, all of Fed. Rep. of Germany

[73] Assignee: Bayer Aktiengesellschaft, Leverkusen, Fed. Rep. of Germany

[21] Appl. No.: 717,058

[22] Filed: Mar. 28, 1985

[30] Foreign Application Priority Data

Apr. 5, 1984 [DE] Fed. Rep. of Germany ....... 3412729
Oct. 31, 1984 [DE] Fed. Rep. of Germany ....... 3439755

[51] Int. Cl.$^4$ .................... C09B 19/00; C09B 19/02
[52] U.S. Cl. ................................ 544/76; 544/75
[58] Field of Search .................... 544/75, 76

[56] References Cited

U.S. PATENT DOCUMENTS 3,996,221 12/1976 Leng et al. ............... 544/75 X
4,092,478 5/1978 Plant et al. ............... 544/76
4,336,377 6/1982 Adam et al. ............... 544/74
4,400,504 8/1983 Harms et al. ............... 544/76
4,472,575 9/1984 Renfrew ................... 544/76

FOREIGN PATENT DOCUMENTS

EPA0053743 6/1982 European Pat. Off. .
1265698 11/1968 Fed. Rep. of Germany .

Primary Examiner—Richard L. Raymond
Attorney, Agent, or Firm—Sprung, Horn, Kramer & Woods

[57] ABSTRACT

Triphendioxazine dyestuffs of the formula

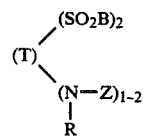

having the substituent meanings specified in the descriptive part, are highly suitable for dyeing and printing hydroxyl- or amido-containing materials, in particular fibre materials, and produce wash-fast dyeings and prints.

7 Claims, No Drawings

TRIPHENDIOXAZINE DYESTUFFS

The present invention relates to new triphendioxazine dyestuffs of the formula $$T \begin{matrix} (SO_2B)_2 \\ (N-Z)_{1-2} \\ | \\ R \end{matrix} \qquad (1)$$

wherein
- T = radical of a triphendioxazine dyestuff,
- B = CH=CH$_2$ or CH$_2$CH$_2$W, wherein
- W = detachable group, such as OSO$_3$H, Cl, S$_2$O$_3$H, OCOCH$_3$, OPO$_3$H$_2$ or —N(CH$_3$)$_3$,
- R = H or optionally substituted C$_1$-C$_4$-alkyl,
- Z = reactive group or H.

The radical SO$_2$B is preferably bonded directly to an aromatic carbocyclic ring of T.

The radical $$-N-Z \\ | \\ R$$

can be bonded to an aromatic carbocyclic ring of T directly or via a bridge member.

The application relates in particularly to new triphendioxazine dyestuffs of the formula $$\text{(1a)}$$

wherein
- B, R and Z are as defined above,
- T$_1$ and T$_2$ stand for H, Cl, BR, C$_1$-C$_4$-alkoxy, C$_1$-C$_4$-alkyl, optionally substituted phenyl or phenoxy,
- X stands for O, S or $$\begin{matrix} N, \\ | \\ R'' \end{matrix}$$

- Y stands for an optionally further-substituted divalent aliphatic, araliphatic, cycloaliphatic or aromatic radical, or
- X and Y together stand for a direct bond or $$\begin{matrix} -N-, \\ | \\ R \end{matrix}$$

- R' stands for halogen, in particular Cl and Br, SO$_3$H, C$_1$-C$_4$-alkyl, C$_1$-C$_4$-alkoxy or COOH,
- R'' stands for hydrogen or optionally substituted C$_1$-C$_4$-alkyl and in the event that Y denotes an optionally substituted divalent aliphatic radical together with R also stands for alkylene, preferably —CH$_2$CH$_2$—,
- n denotes 0 or 1 and wherein
the radical SO$_2$B is in the ortho-position relative to the substituent $$-X-Y-N-Z. \\ | \\ R$$

The substituent $$-X-Y-N-Z \\ | \\ R$$

is preferably in the p-position relative to the ring nitrogen.

In preferred dyestuffs within the scope of the formula (1a), —X—Y stands for a direct bond and one substituent Z stands for a reactive group and the other substituent Z stands for hydrogen.

Preferred substituents for R = optionally substituted C$_1$-C$_4$-alkyl are: OH, OCH$_3$, COOH and SO$_3$H.

Examples of R are: CH$_3$, C$_2$H$_5$, n—C$_3$H$_7$, i—C$_3$H$_7$ and n—C$_4$H$_9$ which can all be substituted by OH, OCH$_3$, COOH or SO$_3$H. Examples of substituents for the optionally substituted phenyl and phenoxy radicals T$_1$ and T$_2$ are Cl, CH$_3$, C$_2$H$_5$, OCH$_3$ and OC$_2$H$_5$.

If further substituted, the radicals Y preferably bear the following further substituents: SO$_3$H, OSO$_3$H, COOH, CH$_3$, OCH$_3$, optionally substituted phenyl.

Furthermore, the araliphatic, aliphatic or cycloaliphatic radicals Y can be interrupted by heteroatoms or heteroatom groups or by the phenyl grouping. Examples are: O, S, NH and N(COCH$_3$).

(a) Examples of aromatic radicals Y are:

(b) Examples of araliphatic radicals Y are:

-continued

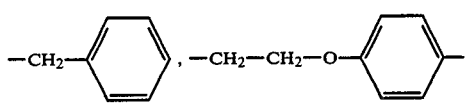

(c) Examples of aliphatic and cycloaliphatic radicals Y are:

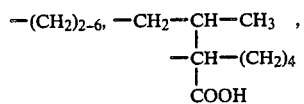

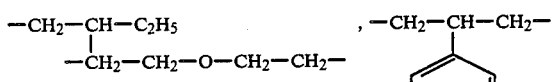
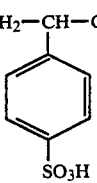

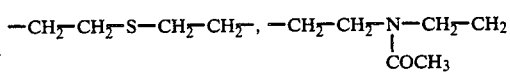

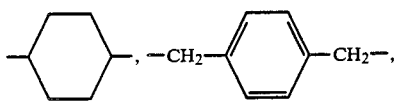

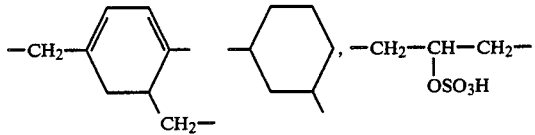

A suitable radical

is in particular also

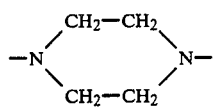

Reactive groups Z which are suitable for the dyestuffs according to the invention are in particular those which are heterocyclic and include at least one detachable substituent in a bond with a heterocyclic radical, are inter alia those which include at least one reactive substituent in a bond with a 5- or 6-membered heterocyclic ring, such as a monazine, diazine, triazine, for example, pyridine, pyrimidine, pyridazine, pyrazine, thiazine, oxazine or asymmetrical or symmetrical triazine ring, or with such a ring system as has one or more fused-on aromatic rings, such as a quinoline, phthalazine, cinnoline, quinazoline, quinoxaline, acridine, phenazine or phenanthridine ring system; the 5- or 6-membered heterocyclic rings which have at least one reactive substituent are accordingly preferably those which contain one or more nitrogen atoms and can contain 5- or preferably 6-membered fused-on carbocyclic rings.

Examples of the reactive substituents on the heterocyclic system include: halogen (Cl, Br or F), ammonium, including hydrazinium, sulphonium, sulphonyl, azido(—$N_3$), thiocyanato, thio, thiolether, oxyether, sulphinic acid and sulphonic acid. Specific examples thereof are: mono- or di-halogenosymmetric-triazinyl radicals, for example 2,4-dichlorotriazin-6-yl, 2-amino-4-chlorotriazin-6-yl, 2-alkylamino-4-chlorotriazin-6-yl, such as 2-methylamino-4-chlorotriazin-6-yl or 2-ethylamino- or 3-propylamino-4-chlorotriazin-6-yl, 2-$\beta$-hydroxyethylamino-4-chlorotriazin-6-yl, 2-di-$\beta$-hydroxyethylamino-4-chlorotriazin-6-yl and the corresponding sulphuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted arylamino-4-chlorotriazin-6-yl, such as 2-phenylamino-4-chlorotriazin-6-yl, 2-(o-, m- or p-carboxy- or -sulphophenyl)-amino-4-chlorotriazin-6-yl, 2-alkoxy-4-chlorotriazin-6-yl, such as 2-methoxy- or -ethoxy-4-chlorotriazin-6-yl, 2-(phenyl-sulphonylmethoxy)-4-chlorotriazin-6-yl, 2-aryloxy- and substituted aryloxy-4-chlorotriazin-6-yl, such as 2-phenoxy-4-chlorotriazin-6-yl, 2-(p-sulphophenyl)-hydroxy-4-chlorotriazin-6-yl and 2-(o-, m- or p-methyl- or -methoxyphenyl)-hydroxy-4-chlorotriazin-6-yl, 2-alkylmercapto- or 2-arylmercapto- or 2-(substituted aryl)mercapto-4-chlorotriazin-6-yl, such as 2-$\beta$-hydroxyethylmercapto-4-chlorotriazin-6-yl, 2-phenylmercapto-4-chlorotriazin-6-yl, 3-(4'-methylphenyl)-mercapto-4-chlorotriazin-6-yl and 2-(2',4'-dinitro)-phenyl-mercapto-4-chlorotriazin-6-yl, 2-methyl-4-chlorotriazin-6-yl, 2-phenyl-4-chlorotriazin-6-yl, 2,4-difluorotriazin-6-yl, monofluorotriazinyl radicals which are substituted by amino, alkylamino, aralkylamino or acylamino groups, alkyl denoting, in particular, optionally substituted $C_1$-$C_4$-alkyl, aralkyl denoting, in particular, optionally substituted phenyl-$C_1$-$C_4$-alkyl and aryl denoting, in particular, phenyl or naphthyl which is optionally substituted by sulpho, alkyl, in particular $C_1$-$C_4$-alkyl, alkoxy, in particular $C_1$-$C_4$-alkoxy, carboxyl or acylamino groups and halogen atoms, such as fluorine, chlorine or bromine, for example 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-$\beta$-methoxyethylamino-4-fluorotriazin-6-yl, 2-$\beta$-hydroxyethylamino-4-fluorotriazin-6-yl, 2-di-($\beta$-hydroxyethylamino)-4-fluorotriazin-6-yl, 2-$\beta$-sulphoethylamino-4-fluorotriazin-6-yl, 2-$\beta$-sulphoethyl-methylamino-4-fluorotriazin-6-yl, 2-carboxymethylamino-4-fluorotriazin-6-yl, 2-$\beta$-cyanoethylamino-4-fluorotriazin-6-yl, 2-benzylamino-4-fluorotriazin-6-yl, 2-$\beta$-phenylethylamino-4-fluorotriazin-6-yl, 2-benzyl-methylamino-4-fluorotriazin-6-yl, 2-(x-sulphobenzyl)-amino-4-fluorotriazin-6-yl, 2-cyclohexylamino-4-fluorotriazin-6-yl, 2-(o-, m- or p-methylphenyl)-amino-4-fluorotriazin-6-yl, 2-(o-, m- or p-sulphophenyl)-amino-4-fluorotriazin-6-yl, 2-(2',5'-disulphophenyl)-amino-4-fluorotriazin-6-yl, 2-(o-, m- or p-chlorophenyl)-amino-4-fluorotriazin-6-yl, 2-(o-, m- or p-methoxyphenyl)-4-fluorotriazin-6-yl, 2-(2'-methyl-4'-sulphophenyl)-amino-4-fluorotriazin-6-yl, 2-(2'-methyl-5'-sulphophenyl)-amino-4-fluorotriazin-6-yl, 2-(2'-chloro-4'-sulphophenyl)-amino-4-fluorotriazin-6-yl, 2-(2'-chloro-5'-sulphophenyl)-amino-4-fluorotriazin-6-yl, 2-(2'-methoxy-4'-sulphophenyl)-amino-4-fluorotriazin-6-yl, 2-(o-, m- or p-carboxyphenyl)-amino-4-fluorotriazin-6-yl, 2-(2',4'-disulphophenyl)-amino-4-fluorotriazin-6-yl, 2-(3',5'-disulphophenyl)-amino-4-fluorotriazin-6-yl, 2-(2'-carboxy-4-sulphophenyl)-amino-4-fluorotriazin-6-yl, 2-(2'-carboxy-4-sulphophenyl)-amino-4-fluoro-triazin-6-yl, 2-(6'-sulphonaphth-2'-yl)-amino-4-fluorotriazin-6-yl, 2-(4',8'-disulphonaphth-2'-yl)-amino-4-fluorotriazin-6-yl, 2-(6',8'-disulphonaphth-2'-yl)-amino-4-fluorotriazin-6-yl, 2-(N-methylphenyl)-amino-4-fluorotriazin-6-yl, 2-(N-ethylphenyl)-amino-4-fluorotriazin-6-yl, 2-(N-$\beta$-hydroxyethylphenyl)-amino-4-fluorotriazin-6-yl, 2-(N-isopropylphenyl)-amino-4-fluorotriazin-6-yl, 2-morpholino-4-fluorotriazin-6-yl, 2-piperidino-4-fluorotriazin-6-yl, 2-(4',6',8'-trisulphonaphth-2'-yl)-4-fluorotriazin-6-yl, 2-(3',6',8'-trisulphonaphth-2'-yl)-4-fluorotriazin-6-yl, 2-(3',6'-disulphonaphth-1'-yl)-4-fluorotriazin-6-yl, mono-, di- or tri-halogenopyrimidinyl radicals, such as 2,4-dichloropyrimidin-6-yl, 2,4,5-trichloropyrimidin-6-yl, 2,4-dichloro-5-nitro-, -5-methyl-, -5-carboxymethyl-, -5-carboxy-, -5-cyano-, -5-vinyl-, -5-sulpho-, -5-mono-, -di- or -tri-chloromethyl- or -5-carboalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloro-6'-pyridazin-1'-yl)-phenylsulphonyl or -carbonyl, $\beta$-(4',5'-dichloro-6'-pyridazon-1'-yl)-ethylcarbonyl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl and the corresponding bromine and fluorine derivatives of the above-mentioned chlorine-substituted heterocyclic radicals, and of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or —5-methyl-sulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbo-methoxy-4-pyrimidinyl, 2,6-difluoro-5-trifluoromethyl-4-pyrimidinyl, 6-fluoro-5-chloropyrimidin-4-yl, 6-fluoro-5-trifluoromethylpyrimidin-4-yl, 6-fluoro-2-methylpyrimidin-4-yl, 6-fluoro-5-chloro-2-methylpyrimidin-4-yl, 5,6-difluoropyrimidin-4-yl, 6-fluoro-5-chloro-2-trifluoromethylpyrimidin-4-yl, 6-fluoro-2-phenylpyrimidin-4-yl, 6-fluoro-5-cyanopyrimidin-4-yl, 6-fluoro-5-nitropyrimidin-4-yl, 6-fluoro-5-methylsulphonylpyrimidin-4-yl, 6-fluoro-5-phenylsulphonylpyrimidin-4-yl, triazine radiacals containing sulphonyl groups, such as 2,4-bis-(phenylsulphonyl)-triazin-6-yl, 2-(3'-carboxyphenyl)-sulphonyl-4-chlorotriazin-6-yl, 2-(3'-sulphophenyl)-sulphonyl-4-chlorotriazin-6-yl and 2,4-bis-(3'-carboxyphenylsulphonyl)-triazin-6-yl; pyrimidine rings containing sulphonyl groups, such as 2-carboxy-methylsulphonyl-pyrimidin-4-yl, 2-methylsulphonyl-6-methyl-pyrimidin-4-yl, 2-methylsulphonyl-6-ethyl-pyrimidin-4-yl, 2-phenylsulphonyl-5-chloro-6-methylpyrimidin-4-yl, 2,6-bis-methylsulphonyl-pyrimidin-4-yl, 2,6-bis-methyl-sulphonyl-5-chloro-pyrimidin-4-yl, 2,4-bis-methylsulphonyl-pyrimidine-5-sulphonyl, 2-methylsulphonyl-pyrimidin-4-yl, 2-phenylsulphonyl-pyrimidin-4-yl, 2-trichloromethylsulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethyl-pyrimidin-4-yl, 2-methylsulphonyl-5-chloro-6-chloromethyl-pyrimidin-4-yl, 2-methylsulphonyl-4-chloro-6-methyl-pyrimidine-5-sulphonyl, 2-methylsulphonyl-5-nitro-6-methyl-pyrimidin-4-yl, 2,5,6-trismethylsulphonyl-pyrimidin-4-yl, 2-methylsulphonyl-5,6-dimethyl-pyrimidin-4-yl, 2-ethylsulphonyl-5-chloro-6-methyl-pyrimidin-4-yl, 2-methylsulphonyl-6-chloropyrimidin-4-yl, 2,6-bis-methylsulphonyl-5-chloropyrimidin-4-yl, 2-methylsulphonyl-6-carbonyl-pyrimidin-4-yl, 2-methylsulphonyl-5-sulpho-pyrimidin-4-yl, 2-methylsulphonyl-6-carbomethoxy-pyrimidin-4-yl, 2-methylsulphonyl-5-carboxypyrimidin-4-yl, 2-methylsulphonyl-5-cyano-6-methoxypyrimidin-4-yl, 2-methylsulphonyl-5-chloro-pyrimidin-4-yl, 2-sulphoethylsulphonyl-6-methyl-pyrimidin-4-yl, 2-methylsulphonyl-5-bromo-pyrimidin-4-yl, 2-phenylsulphonyl-5-chloro-pyrimidin-4-yl, 2-carboxymethylsulphonyl-5-chloro-methyl-pyrimidin-4-yl, 2-methylsulphonyl-6-chloropyrimidine-4- and -5-carbonyl, 2,6-bis(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl and 2-methylsulphonyl-4-chloro-6-methylpyrimidine-5-sulphonyl or -carbonyl; triazine rings containing ammonium groups, such as trimethylammonium-4-phenyl-amino- or -4-(o-, m- or p-sulphophenyl)-amino-triazin-6-yl, 2-(1,1-dimethylhydrazinium)-4-phenyl-amino- or -4-(o-, m- or p-sulphophenyl)-aminotriazin-6-yl, 2-(2-isopropylidene-1,1-dimethyl)-hydrazinium-4-phenylamino- or -4-(o-; m- or p-sulphophenyl)-aminotriazin-6-yl, 2-N-amino-pyrrolidinium- or 2-aminopiperidinium-4-phenylamino- or -4-(o-, m- or p-sulphophenyl)-aminotriazin-6-yl, 2-N-aminopyrrolidinium- or 2-N-aminopiperidinium-4-phenylamino- or -4-(o-, m- or p-sulphophenyl)-aminotriazin-6-yl, and furthermore 4-phenylamino- or -4-(sulphophenylamino)-triazin-6-yl radicals which contain 1,4-bis-azabicyclo-[2,2,2]-octane or 1,2-bis-aza-bicyclo-[0,3,3]-octane bonded in quaternary form in the 2-position via a nitrogen bond, and 2-pyridinium-4- phenylamino- or -4-(o-, m- or p-sulphophenyl)-aminotriazin-6-yl and the corresponding 2-onium-triazin-6-yl radicals which are substituted in the 4-position by alkylamino, such as methylamino, ethylamino or β-hydroxyethylamino, alkoxy, such as methoxy or ethoxy, aryloxy, such as phenoxy, or sulphophenoxy groups; 2-chlorobenzothiazole-5- or -6-carbonyl or -5- or -6-sulphonyl, 2-arylsulphonyl- or -alkylsulphonyl-benzothiazole-5- or -6-carbonyl or -5- or -6-sulphonyl, such as 2-methylsulphonyl- or 2-ethoxysulphonylbenzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or -sulphonyl derivatives containing sulpho groups in the fused-on benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or 4- or -5-sulphonyl, the N-oxide of 4-chloro- or 4-nitroquinoline-5-carbonyl or even the radicals 5-chloro-2,6-difluoro-1,3-dicyanophenyl, 2,4-difluoro-1,3,5-tricyanophenyl, 2,4,5-trifluoro-1,3-dicyanophenyl, 2,4-dichloro-5-methylsulphonyl-pyrimidin-6-yl, 2,4-trichloro-5-ethylsulphonyl-pyrimidin-6-yl, 2-fluoro-5-methylsulphonyl-6'-(2'-sulphophenylamino)-pyrimidin-4-yl and 2,5-dichloro-6-methylsulphonyl-pyrimidin-4-yl.

Reactive groups of the aliphatic series may also be mentioned, such as acryloyl, mono-, di- or tri-chloroacryloyl, such as —CO—CH=CH—Cl, —CO—CCl=CH$_2$ and —CO—CCl=CH—CH$_3$, and furthermore —CO—CCl=CH—COOH, —CO—CH=CCl—COOH,β-chloropropionyl, 3-phenylsulphonylpropionyl, 3-methylsulphonylpropionyl, 2-fluoro-2-chloro-3,3-difluorocyclobutane-1-carbonyl, 2,2,3,3-tetrafluorocyclobutane-1-carbonyl or -1-sulphonyl,β-(2,2,3,3-tetrafluoro-1-cyclobutyl)-acryloxy and α- or β-bromoacryloyl, or α- or β-alkyl- or -arylsulphonylacryloyl groups, such as α- or β-methylsulphonylacryloyl and chloroacetyl.

In the formula (1a), the following groupings have a preferred meaning:

$T_1$ and $T_2$=Cl,

X=

Y=aliphatic, aromatic or araliphatic radical
Z=radical of the monofluorotriazine or monochlorotriazine series, in particular of the monofluorotriazine series
B=CH$_2$CH$_2$OSO$_3$H.

Within the scope of the formula (1a), the following dyestuffs are preferred:

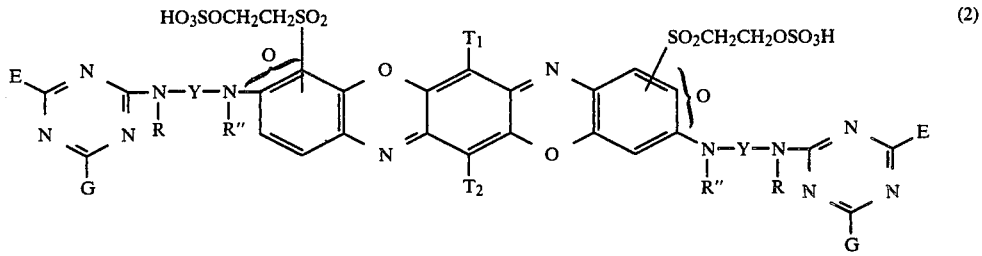

(2)

wherein
Y, R, R", T$_1$ and T$_2$ are as defined above,
G=F or Cl and
E=an optionally substituted amino group

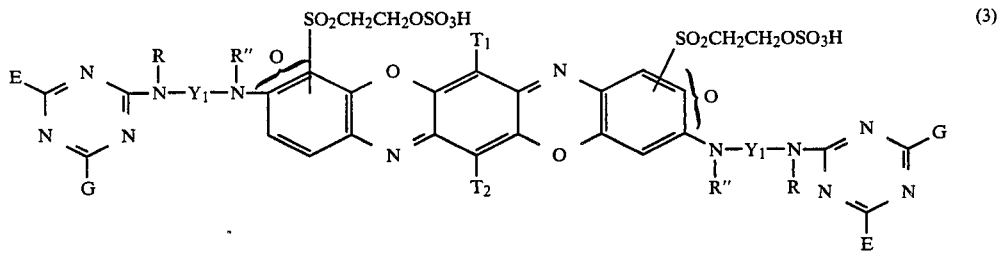

(3)

wherein
R, R", E and G are as defined above, and
Y$_1$=divalent aliphatic radical

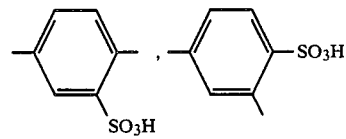

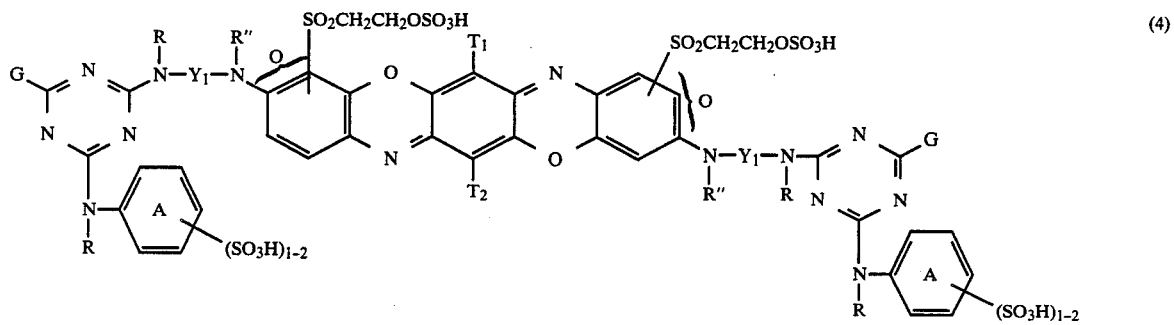

wherein
R, R″, $Y_1$ and G are as defined above and the benzene nucleus A can contain still further substituents. As such may be mentioned: Cl, $CH_3$, $CH_3O$ and COOH.

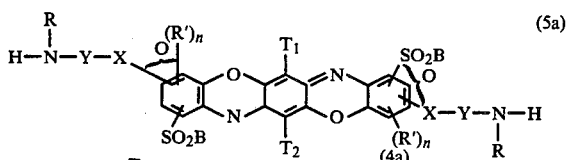

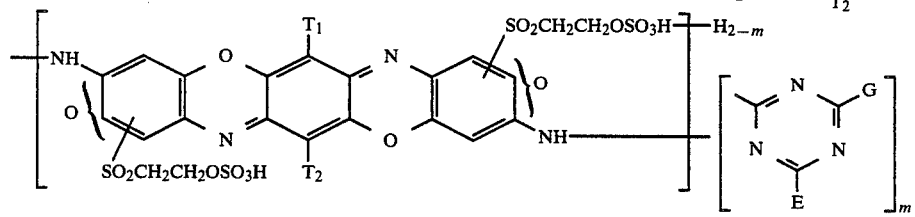

wherein
m = 1 or 2.

Preference is also given to dyestuffs of the formulae (2), (3) and (4)
wherein
R and R″ = H
and the other substituents are as defined above.

Preference is also given to dyestuffs of the formulae (3), (4) and (4a)
wherein
$Y_1 = CH_2—CH_2$, $CH_2—CH_2—CH_2$, $CH_2—CH_2—CH_2—CH_2$ or

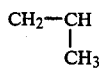

and
G = F and
the other substituents are as defined above.

Very generally, $T_1$ and $T_2$ preferably stand for Cl.

The invention also provides a process for preparing the reactive dyestuffs of the formula (1) which is characterised in that 1 mole of a triphendioxazine dyestuff of the formula

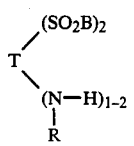

in particular a triphendioxazine dyestuff of the formula is condensed with 1–2 moles of a reactive component of the formula

U—Z (6)

wherein

U represents a substituent (preferably halogen) which is detachable in the form of an anion, by elimination of U-H. This acylation is generally carried out in water at temperatures of 0° to 80° C.—depending on the reactivity of 6—and in a weakly alkaline, neutral or weakly acid medium.

Examples of suitable reactive components of the formula (6) are the halides, in particular the chlorides, of the Z components mentioned. Of the large number of available compounds, the following may be mentioned here as a selection: trihalogeno-symmetrical-triazines, such as cyanuric chloride and cyanuric bromide, dihalogenomonoamino- and monosubstituted amino-symmetrical triazines, such as 2,6-dichloro-4-aminotriazine, 2,6-dichloro-4-methylaminotriazine, 2,6-dichloro-4-ethylaminotriazine, 2,6-dichloro-4-oxyethylaminotriazine, 2,6-dichloro-4-phenylaminotriazine, 2,6-dichloro-4-(o-, m- or p-sulphophenyl)-aminotriazine, 2,6-dichloro-4-(2′,3′-, 2′,4′-, 3′,4′- or 3′-disulphophenyl)-aminotriazine, dihalogeno-alkoxy- and aryloxy-symmetrical triazines, such as 2,6-dichloro-4-methoxytriazine, 2,6-dichloro-4-ethoxytriazine, 2,6-dichloro-4-phenoxytriazine, 2,6-dichloro-4-(o-, m- or p-sulphophenyl)-oxytriazine, dihalogenoalkylmercapto- and -arylmercapto-symmetrical triazines, such as 2,6-dichloro-4-ethylmercaptotriazine, 2,6-dichloro-4-phenylmercaptotriazine, 2,6-dichloro-4-(p-methylphenyl)-mercaptotriazine, 2,4,6-trifluorotriazine, 2,4-difluoro-6-(o-, m-, p-methyl-phenyl)-amino-triazine, 2,4-difluoro-6-(o-, m-, p-sulphophenyl)-amino-triazine, 2,4-difluoro-6-methoxy-triazine, 2,4-difluoro-6-(2',5'-disulphophenyl)-amino-triazine, 2,4-difluoro-6-(6'-sulphonaphth-2'-yl)-amino-triazine, 2,4-difluoro-6-(o-, m-, p-ethylphenyl)-amino-triazine, 2,4-difluoro-6-(o-, m-, p-chlorophenyl)-amino-triazine, 2,4-difluoro-6-(o-, m-, p-methoxyphenyl)-amino-triazine, 2,4-difluoro-6-(2'-methyl-5'-sulphophenyl)-amino-triazine, 2,4-difluoro-6-(2'-methyl-4'-sulphophenyl)-amino-triazine, 2,4-difluoro-6-(2'-chloro-4'-sulphophenyl)-amino-triazine, 2,4-difluoro-6-(2'-methoxy-4'-sulphophenyl)-amino-triazine, 2,4-difluoro-6-(o-, m-, p-carboxyphenyl)-amino-triazine, 2,4-difluoro-6-(N-methyl-phenyl)-amino-triazine, 2,4-difluoro-6-(N-ethyl-phenyl)-amino-triazine, 2,4-difluoro-6-(N-isopropylphenyl)-amino-triazine, 2,4-difluoro-6-cyclohexylaminotriazine, 2,4-difluoro-6-morpholino-triazine, 2,4-difluoro-6-piperidino-triazine, 2,4-difluoro-6-benzylaminotriazine, 2,4-difluoro-6-N-methyl-benzylamino-triazine, 2,4-difluoro-6-phenylethyl-amino-triazine, 2,4-difluoro-6-(X-sulpho-benzyl)-amino-triazine, 2,4-difluoro-6-(2',4'-disulphophenyl)-amino-triazine, 2,4-difluoro-6-(3',5'-disulphophenyl)-amino-triazine, 2,4-difluoro-6-(2'-carboxy-4'-sulpho-phenyl)-amino-triazine, 2,4-difluoro-6-(2',5'-disulpho-4-methoxyphenyl)-amino-triazine, 2,4-difluoro-(2'-methyl-4',6'-disulphophenyl)-amino-triazine, 2,4-difluoro-(6',8'-disulphonaphth-2'yl)-amino-triazine, 2,4-difluoro-(4',8'-disulphonaphth-2'yl)-amino-triazinem 2,4-difluoro-(4',6',8'-trisulpho-naphth-2'-yl)-amino-triazine, 2,4-difluoro-(3',6',8'-trisulphonaphth-2'-yl)-aminotriazine, 2,4-difluoro-(3',6'-disulphonaphth-1'-yl)-aminotriazine, 2,4-difluoro-6-amino-triazine, 2,4-difluoro-6-methylamino-triazine, 2,4-difluoro-6-ethylamino-triazine, 2,4-difluoro-6-methoxyethoxy-triazine, 2,4-difluoro-6-methoxyethylamino-triazine, 2,4-difluoro-6-dimethylaminotriazine, 2,4-difluoro-6-diethylamino-triazine, 2,4-difluoro-6-iso-propylamino-triazine, tetrahalogenopyrimidines, such as tetrachloro-, tetrabromo- or tetrafluoropyrimidine, 2,4,6-trihalogenopyrimidines, such as 2,4,6-trichloro-, tribromo- or trifluoro-pyrimidine, dihalogenopyrimidines, such as 2,4-dichloro-, -dibromo- or -difluoropyrimidine; 2,4,6-trichloro-5-nitro- or -5-methyl- or -5-carbomethoxy- or -5-carboethoxy- or -5-carboxymethyl- or -5-mono-, -di- or -trichloromethyl- or -5-carboxy- or -5-sulpho- or -5-cyano- or -5-vinyl-pyrimidine, 2,4-difluoro-6-methylpyrimidine, 2,6-difluoro-4-methyl-5-chloropyrimidine, 2,4-difluoropyrimidine-5-ethylsulphone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -di-bromopyrimidine, 4,6-difluoro-2,5-dichloro- or di-bromopyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, alkyl 2,4,6-trifluoropyrimidine-5-carboxylates or -5-carboxamides, 2,6-difluoro-5-methyl-4-chloropyrimidine, 2,6-difluoro-5-chloropyrimidine, 2,4,6-trifluoro-5-methylpyrimidine, 2,4,5-trichloro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoropyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro5-nitro-pyrimidine, 2,4-difluoro-5-trifluoromethylpyrimide, 2,4-difluoro-5-methylsulphonyl-pyrimidine, 2,4-difluoro-5-phenyl-pyrimidine, 2,4-difluoro-5-carboxamidopyrimidine, 2,4-difluoro-5-carbomethyl-pyrimidine, 2,4-difluoro-6-trifluoromethylpyrimidine, 2,4-di-fluoro-6-carboxamidopyrimidine, 2,4-difluoro-6-carbomethoxy-pyrimidine, 2,4-difluoro-6-phenyl-pyrimidine, 2,4-difluoro-6-cyanopyrimidine, 2,4,6-trifluoro-5-methylsulphonylpyrimidine, 2,4-difluoro-5-sulphonamido-pyrimidine, 2,4-difluoro-5-chloro-6-carbomethoxy-pyrimidine, 5-trifluoromethyl-2,4-difluoro-pyrimidine, 4,6-difluoro-5-chloropyrimidine, 4,6-difluoro-5-trifluoromethyl-pyrimidine, 4,6-difluoro-2-methyl-pyrimidine, 4,6-difluoro-6-chloro-2-methyl-pyrimidine, 4,5,6-trifluoropyrimidine, 4,6-difluoro-5-chloro-2-trifluoromethyl-pyrimidine, 4,6-difluoro-2-phenyl-pyrimidine, 4,6-difluoro-5-cyano-pyrimidine, 4,6-difluoro-5-nitro-pyrimidine, 4,6-difluoro-5-methylsulphonyl-pyrimidine, 4,6-difluoro-5-phenylsulphonylpyrimidine, 2,4-dichloropyrimidine-5-carbonyl chloride, 2,4,6-trichloropyrimidine-5-carbonyl chloride, 2-methyl-4-chloropyrimidine-5-carbonyl chloride, 2-chloro-4-methylpyrimidine-5-carbonyl chloride, 2,6-dichloropyrimidine-4-carbonyl chloride; pyrimidine reactive components having detachable sulphonyl groups, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-trimethylsulphonyl-pyrimidine, 2,6-bis-methylsulphonyl-4,6-dichloropyrimidine, 2,4-bis-methylsulphonylpyrimidine-5-sulphonyl chloride, 2-methylsulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonyl chloride, 2-methylsulphonyl-5-chloro-5-nitro-6-methylpyrimidine, 2,4,5,6-tetramethylsulphonyl-pyrimidine, 2-methylsulphonyl-4-chloro-5,6-dimethylpyrimidine, 2-ethylsulphonyl-4,6-dichloro-6-methylpyrimidine, 2-methylsulphonyl-4,6-dichloropyrimidine, 2,4,6-tris-methyl-sulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxypyrimidine, 2-methylsulphonyl-4-chloropyrimidine-5-carboxylic acid, 2-methylsulphonyl-4-chloro-5-cyano-methoxypyrimidine, 2-methylsulphonyl-4,5-dichloropyrimidine, 4,6-bis-methylsulphonyl-pyrimidine, 4-methylsulphonyl-6-chloropyrimidine, 2-sulphoethylsulphonyl-4-chloro-6-methylpyrimidine, 2-methylsulphonyl-4-chloro-5-bromopyrimidine, 2-methylsulphonyl-4-chloro-5-bromo-6-methylpyrimidine, 2,4-bismethylsulphonyl-5-chloro-pyrimidine, 2-phenylsulphonyl-4,5-dichloropyrimidine, 2-phenylsulphonyl-4,5-dichloro-6-methylpyrimidine, 2-carboxymethylsulphonyl-4,5-dichloro-6-methylpyrimidine, 2-(2'- or 3'- or 4'-carboxy-phenylsulphonyl)-4,5-dichloro-6-methylpyrimidine, 2,4-bis-(2'- or 3'- or 4'-carboxyphenylsulphonyl)-5-chloro-6-methylpyrimidine, 2-methylsulphonyl-6-chloropyrimidine-4-or -5-carbonyl chloride, 2-ethylsulphonyl-6-chloropyrimidine-4- or -5-carbonyl chloride, 2,6-bis-(methylsulphonyl)-pyrimidine-4-carbonyl chloride, 2-methylsulphonyl-6-methyl-4-chloro- or -4-bromopyrimidine-5-carbonyl chloride or bromide, 2,6-bis-(methylsulphonyl)-4-chloropyrimidine-5-carbonyl chloride; further reactive components of the heterocyclic series having reactive sulphonyl substituents are for example 3,6-bis-phenylsulphonylpyridazine, 3-methylsulphonyl-6-chloridazine, 3,6-bis-trichloromethylsulphonylpyridazine, 3,6-bis-methylsulphonyl-4-methylpyridazine, 2,5,6-tris-methylsulphonylpyridazine, 2,4-bis-methylsulphonyl-1,3,5-triazine, 2,4-bis-methylsulphonyl-6-(3'-sulphonylaino)-1,3,5-triazine, 2,4-bis-methylsulphonyl-6-N-methylanilino-1,3,5-triazine, 2,4-bis-methylsulphonyl-6-phenoxy-1,3,5-triazine, 2,4-bis-methylsulphonyl-6-trichloroethoxy-1,3,5-triazine, 2,4,6-tris-phenylsulphonyl-1,3,5-triazine; 2,4-bis-methylsulphonylquinazoline, 2,4-bis-trichloromethylsulphonylqinoline, 2,4-bis-carboxymethylsulphonylquinoline, 2,6-bis-(methylsulphonyl)-pyridine-4-carbonyl chloride and 1-(4'-chlorocarbonylphenyl)- or -(2'-chlorocarbonylethyl)-4,5-bis-methylsulphonylpyridaz-6-one; further heterocyclic reactive components having mobile halogen are inter alia 2- or 3-monochloroquinoxaline-6-carbonyl chloride or -6-sulphonyl chloride, 2- or 3-monobromoquinoxaline-6-carbonyl bromide or -6-sulphonyl bromide, 2,4-dichloroquinoxaline-6-carbonyl chloride or -6-sulphonyl chloride, 2,3-dibromoquinoxaline-6-carbonyl bromide or -6-sulphonyl bromide, 1,4-dichlorophthalazine-6-carbonyl chloride or -6-sulphonyl chloride and the corresponding bromine compounds, 2,4-dichloroquinazoline-6- or -7-carbonyl chloride or -7-sulphonyl chloride and the corresponding bromine compounds, 2- or 3- or 4-(4',5'-dichloropyridaz-6'-in-1'-yl)phenylsulphonyl chloride or -carbonyl chloride and the corresponding bromine compounds, β-(4',5'-dichloropyridaz-6'-in-1'-yl)-ethyl-carbonyl chloride, 2-chloroquinoxaline-3-carbonyl chloride and the corresponding bromine compound, N-methyl-N-(2,4-dichlorotriazin-6-yl)-carbamyl chloride, N-methyl-N-(2-chloro-4-methylamino-triazin-6-yl)-carbamyl chloride, N-methyl-N-(2-chloro-4-dimethylamino-triazin-6-yl)carbamyl chloride, N-methyl- or N-ethyl-N-(2,4-dichlorotriazin-6-yl)-aminoacetyl chloride, N-methyl-, N-ethyl- or N-hydroxyethyl-N-(2,3-dichloroquinoxaline-6-sulphonyl)- or -6-carbonyl)-aminoacetyl chloride and the corresponding bromine derivatives, and also 2-chlorobenzothiazole-5- or -6-carbonyl chloride or -5- or -6-sulphonyl chloride and the corresponding bromine compounds, 2-arylsulphonyl- or 2-alkylsulphonyl-benzothiazole-5- or -6-carbonyl chloride or -5- or -6-sulphonyl chloride, such as 2-methylsulphonyl- or 2-ethylsulphonyl- or 2-phenylsulphonyl-benzothiazole-5- or -6-sulphonyl chloride or -5- or -6-carbonyl chloride and the corresponding 2-sulphonylbenzothiazole derivatives which contain sulpho groups in the fused-on benzene ring, 3,5-bis-methylsulphonylisothiazole-4-carbonyl chloride, 2-chlorobenzoxazole-5- or -6-carbonyl chloride or -sulphonyl chloride and the corresponding bromine derivatives, 2-chlorobenzimidazole-5- or -6-carbonyl chloride or sulphonyl chloride and the corresponding bromine derivatives, 2-chloro-1-methylbenzimidazole-5- or -6-carbonyl chloride or -sulphonyl chloride and the corresponding bromine derivatives, 2-chloro-4-methyl-1,3-thiazole-5-carbonyl chloroide or -4- or -5-sulphonyl chloride, 2-chlorothiazole-4-or -5-sulphonyl chloride and the corresponding bromine derivatives. Further may be mentioned: 5-chloro-2,4,6-trifluoroisophthalonitrile, 2,4,6-trifluoro-1,3,5-tricyanobenzene, 2,4,5,6-tetrafluoroisophthalonitrile, 2,4,6-trichloro-5-methylsulphonylpyrimidine, 2,4,6-trichloro-5-ethylsulphonyl-pyrimidine and 2,4-difluoro-5-methylsulphonyl-6-(2'-sulphophenylaino)-pyrimidine.

Examples which may be mentioned from the series of the aliphatic reactive components are: acryloyl chloride, monochloro-, dichloro- or trichloroacryloyl chloride, 3-chloropropionyl chloride, 3-phenylsulphonylpropionyl chloride, 3-methylsulphonylpropionyl chloride, 3-ethylsulphonylpropionyl chloride, 3-chloroethanesulphonyl chloride, chloromethanesulphonyl chloride, 2-chloroacetyl chloride, 2,2,3,3-tetrafluorocyclobutane-1-carbonyl chloride, β-(2,2,3,3-tetrafluorocyclobut-1-yl)acryloxy chloride, β-(2,2,3,3-trifluoro-2-chlorocyclobut-1-ane)-carbonyl chloride, β-methylsulphonylacryloyl chloride, β-methylsulphonylacryloyl bromide and β-bromoacryloyl chloride and β-bromoacryloyl bromide.

In the preparation of the preferred dyestuffs of the formulae (2), (3) and (4), a further variant results from the fact that the corresponding dyestuff of the formula (5) can be condensed in any order with a triazine of the formula

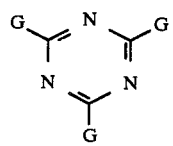 (7)

and with an amine of the formula

H—E (8).

For instance, it is possible (a) to condense 1 mole of a dyestuff of the formula (5) with 2 moles of a triazine of the formula (6) and then to react the bis-acylation product with 2 moles of an amine of the formula (8); or (b) to condense 2 moles of a triazine of the formula (7) and 2 moles of an amine of the formula (8) and to react the primary condensation product with 1 mole of a dyestuff of the formula (5).

Dyestuffs (4a) are preferably prepared by the following method:

The corresponding dyestuffs of the formula (5) are first of all condensed with 1 mole of a triazine (7) and then reacted with 1 mole of an amine (8).

The dyestuffs of the formulae (5) and (5a) can be prepared by known methods.

They are obtained from the dianilides of the formula

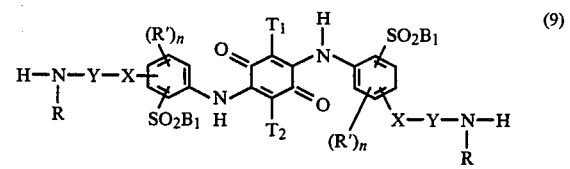 (9)

wherein $B_1 = B$ or $CH_2CH_2OH$ by ring closure with an acid condensing agent. The latter can be for example:

(a) oleum, as described in Examples 1, 123 and 124 of German Offenlegungsschrift No. 2,302,382, in Examples 1, 4, 126, 183 and 184 of German Offenlegungsschrift No. 2,503,611, in Example 1 of U.K. Patent Application No. 2,059,985 and in Examples 1, 114, 235, 282 and 365 of German Offenlegungsschrift No. 2,823,828;

(b) oleum and stoichiometric amounts of persulphate, as described in British Patent Specification No. 1,589,915 or in Example 125 of German Offenlegungsschrift No. 2,823,828;

(c) oleum in the presence of catalytic amounts of iodine, ring closure being effected at 0° to 40° C. with 10-50% strength oleum.

It is particularly preferable to prepare dyestuffs (5) in which $B=CH_2CH_2OSO_3H$ by methods a, b and c from compounds of formula (9) wherein $B_1=CH_2CH_2OH$.

In the ring closure as described in a, b and c, aliphatic hydroxyl groups can be sulphated and aromatic rings can be sulphonated.

The dianilides of the formula (9) can be obtained by methods as described in Example 1 of German Offenlegungsschrift No. 2,503,611 and in particular in Examples 1, 114, 125, 235, 282, 317, 339 and 365 of German Offenlegungsschrift No. 2,823,828.

For instance, compounds of the formula (9) can be obtained by reacting quinones of the formula

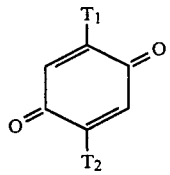

(10)

with 2 moles of a diamine of the formula

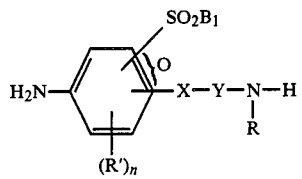

(11)

wherein $T_1$, $T_2$, R', R, X, Y, $B_1$ and n are as defined above.

It is frequently preferable to carry out the reaction between the quinone (10) and the diamine (11) using an excess of the quinone (10) over the amount necessary for the reaction. For example, up to about 3 moles of quinone can be added to the reaction mixture.

This reaction has been found to be particularly suitable for products in which $T_1$ and $T_2$ each stand for H or $C_{1-4}$-alkyl which can be substituted by OH or by $C_{1-4}$-alkoxy.

Examples of quinones of the formula (10) are:
1,4-benzoquinone,
2-methyl-1,4-benzoquinone,
2-ethyl-1,4-benzoquinone,
2-n-propyl-1,4-benzoquinone,
2-isopropyl-1,4-benzoquinone,
2,2'-ethoxyethyl-1,4-benzoquinone,
2-phenyl-1,4-benzoquinone,
2-(4'-methylphenyl)-1,4-benzoquinone,
2-(4'-methoxyphenyl)-1,4-benzoquinone,
2-(3'-chlorophenyl)-1,4-benzoquinone,
2,5-dimethyl-1,4-benzoquinone,
2-methyl-5-ethyl-1,4-benzoquinone,
2-methyl-5-cyclohexyl-1,4-benzoquinone,
2-cyclohexyl-1,4-benzoquinone,
2,5-dibenzyl-1,4-benzoquinone,
2,5-dicyclohexyl-1,4-benzoquinone and
2-benzyl-5-methoxy-1,4-benzoquinone.

Examples of diamines of the formula (11) are as follows:

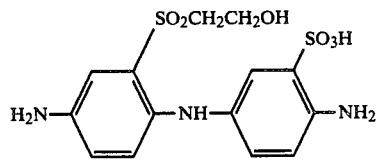

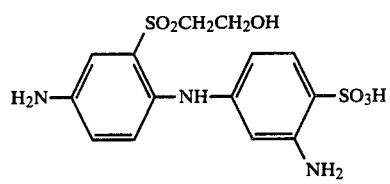

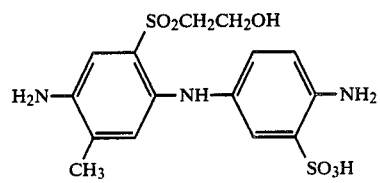

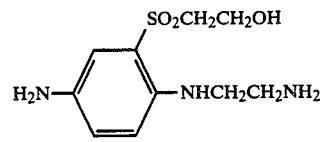

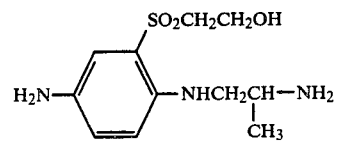

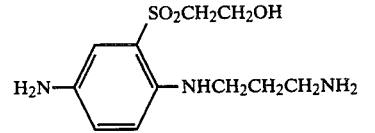

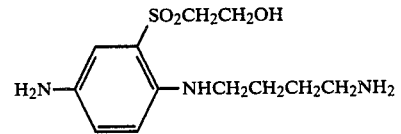

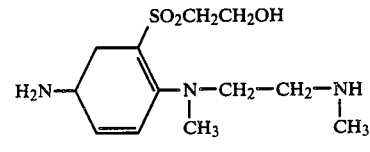

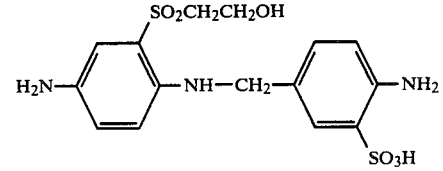

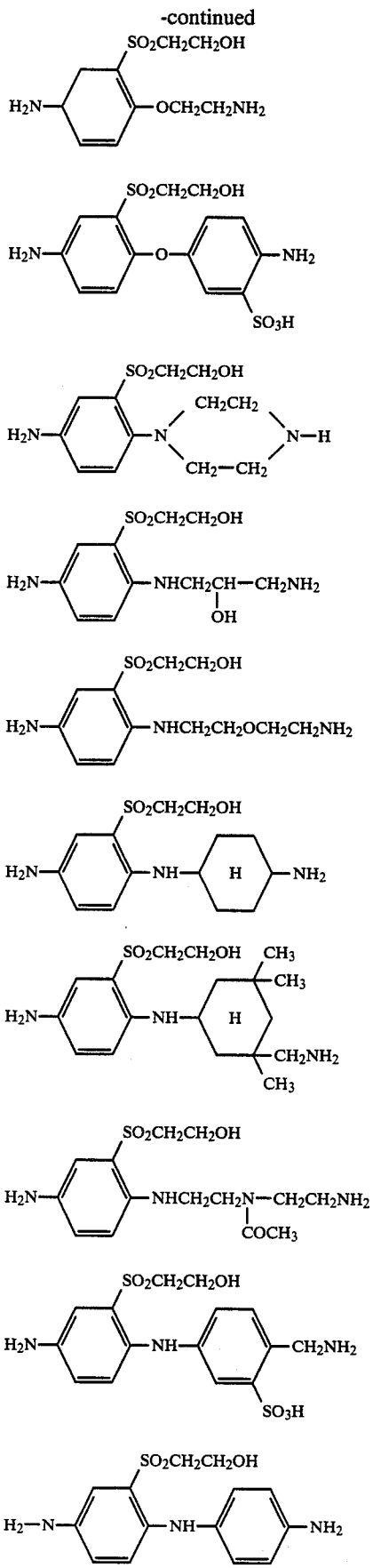

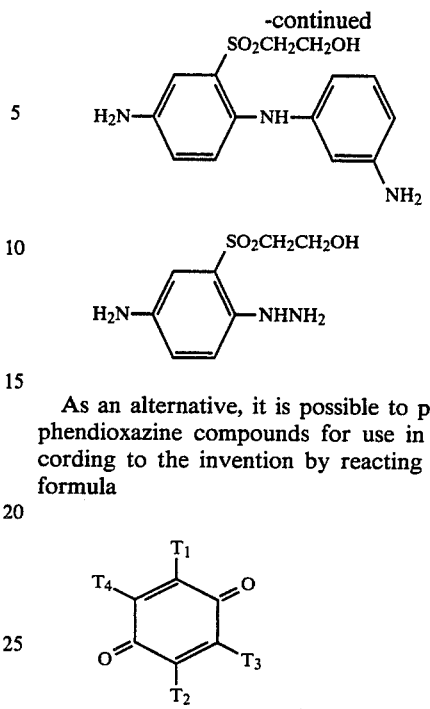

As an alternative, it is possible to prepare aminotriphendioxazine compounds for use in the process according to the invention by reacting quinones of the formula wherein
$T_1$ and $T_2$ are as defined above, and
one of the symbols $T_3$ and $T_4$ stands for H, Cl or Br and the other stands for Cl or Br,
with a diamine of the formula (10).

Examples of quinones of the formula (12) are:
2,3,5,6-tetrachloro-1,4-benzoquinone,
2,3,5,6-tetrabromo-1,4-benzoquinone,
2-methyl-3-chloro-1,4-benzoquinone,
2-methyl-6-chloro-1,4-benzoquinone,
2-methyl-3,5-dichloro-1,4-benzoquinone,
2-methyl-3,5,6-tribromo-1,4-benzoquinone,
2-(4'-methylphenyl)-3,6-dibromo-1,4-benzoquinone,
2-(3'-methylphenoxy)-3,6-dibromo-1,4-benzoquinone,
2-methyl-3,5,6-trichloro-1,4-benzoquinone,
2-methyl-3-chloro-5-bromo-1,4-benzoquinone,
2-methyl-3,6-dichloro-1,4-benzoquinone,
2-methyl-3,6-dichloro-5-bromo-1,4-benzoquinone,
2-phenyl-3,6-dichloro-1,4-benzoquinone,
2-(4'-methoxyphenyl)-3,6-dichloro-1,4-benzoquinone,
2-(4'-chlorophenyl)-3,6-dichloro-1,4-benzoquinone,
2-(4'-nitrophenyl)-3,6-dichloro-1,4-benzoquinone,
2-(4'-nitrophenyl)-3,5,6-trichloro-1,4-benzoquinone,
2,5-dimethyl-3,6-dibromo-1,4-benzoquinone,
2,5-dimethyl-3-chloro-1,4-benzoquinone,
2-methyl-5-n-propyl-6-bromo-1,4-benzoquinone,
2-methyl-5-isopropyl-3-chloro-1,4-benzoquinone,
2-methyl-5-isopropyl-6-bromo-1,4-benzoquinone and
2-(2'-chlorophenyl)-3,5,6-tribromo-1,4-benzoquinone.

The above method is particularly suitable for preparing aminotriphendioxazines in which $T_1$ stands for alkyl or aryl or halogen and $T_2$ stands for halogen.

A further method for preparing aminotriphendioxazines for use in the process according to the invention comprises reacting a quinone of the formula

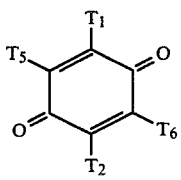

(13)

wherein

T₁ and T₂ are as defined above and one of the symbols T₅ and T₆ stands for H, halogen or OR₂ and the other stands for OR₂, where R₂ stands for alkyl, aryl or aralkyl, which can all be substituted, with a diamine of the formula (11).

If both T₅ and T₆ in the quinone of the formula (13) stand for OR₂, they can be identical or different groups of the OR₂ type.

Examples of quinones of the formula (10) are:
2-ethyl-3,6-dimethoxy-1,4-benzoquinone,
2-chloro-3,6-dimethoxy-1,4-benzoquinone,
2,3,5-trimethoxy-1,4-benzoquinone,
2,5-dimethyl-3,6-dimethoxy-1,4-benzoquinone,
2,5-dimethyl-3,6-dimethoxy-1,4-benzoquinone,
2-methyl-3,6-dimethoxy-1,4-benzoquinone,
2-methyl-5,6-dimethoxy-1,4-benzoquinone,
2-ethyl-3,6-dimethoxy-1,4-benzoquinone,
2-chloro-3-n-propyl-5-methoxy-1,4-benzoquinone,
2-chloro-3,5-dimethoxy-1,4-benzoquinone,
2-methyl-3-methoxy-1,4-benzoquinone,
2,3,5,6-tetramethoxy-1,4-benzoquinone,
2,3,5,6-tetraphenoxy-1,4-benzoquinone,
2,3,5,6-tetra-(4'-methylphenoxy)-1,4-benzoquinone,
2,3,5,6-tetra-(4'-methoxyphenoxy)-1,4-benzoquinone,
2,3,5,6-tetra-(4'-chlorophenoxy)-1,4-benzoquinone,
2,3,5,6-tetra-(3',5'-dimethylphenoxy)-1,4-benzoquinone,
2,3,5,6-tetra-4-(3'-methyl-4'-chlorophenoxy)-1,4-benzoquinone and
2,3,5,6-tetra-(2'-naphthoxy)-1,4-benzoquinone.

The above method for preparing aminotriphendioxazines is particularly suitable for quinones of the formula (13) wherein T₁, T₂, T₅ and T₆ all stand for groups selected from among the types defined above for OR₂.

Examples of triazines of the formula (7) which are used in preparing the preferred dyestuffs of the formulae (3), (4) and (4a) are 2,4,6-trichlorotriazine and 2,4,6-trifluorotriazine.

Examples of amines of the formula (8) which can be used as starting materials for preparing the fibre-reactive dyestuffs of the formulae (3), (4) and (4a) are as follows: ammonia, methylamine, dimethylamine, ethylamine, diethylamine, propylamine, isopropylamine, butylamine, dibutylamine, isobutylamine, sec.-butylamine, hexylamine, methoxyethylamine, ethoxyethylamine, methoxypropylamine, chloroethylamine, hydroxyethylamine, dihydroethylamine, hydroxypropylamine, aminoethanesulphonic acid, β-sulphatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, o-, m-, and p-nitroaniline, o-, m- and p-aminophenyl, 2-methyl-4-nitroaniline, 2-methyl-5-nitroaniline, 2,5-dimethoxyaniline, 3-methyl-4-nitroaniline, 2-nitro-4-methylaniline, 3-nitro-4-methylaniline, o-, m- and p-anisidine, o-, m- and p-phenetidine, 2-methoxy-5-methylaniline, 2-ethoxy-5-methoxyaniline, 4-bromoaniline, 4-aminophenylsulphamide, 3-trifluoromethylaniline, 3- and 4-aminophenylurea, 1-naphthylamine, 2-naphthylamine, 2-amino-1-hydroxynaphthalene, 1-amino-4-hydroxynaphthalene, 1-amino-8-hydroxynaphthalene, 1-amino-2-hydroxy-naphthalene, 1-amino-7-hydroxy-naphthalene, orthanilic acid, metanilic acid, sulphanilic acid, aniline-2,4-disulphonic acid, aniline-2,5-disulphonic acid, aniline-3,5-disulphonic acid, anthranilic acid, m- and p-aminobenzoic acid, 4-aminophenylmethanesulphonic acid, 2-aminotoluene-4-sulphonic acid, 2-aminotoluene-5-sulphonic acid, p-aminosalicylic acid, 1-amino-4-carboxybenzene-3-sulphonic acid, 1-amino-2-carboxy-benzene-5-sulphonic acid, 1-amino-5-carboxybenzene-2-sulphonic acid, 1-naphthylamine-2-, -3-, -4-, -5-, -6-, -7- and -8-sulphonic acid, 2-naphthylamine-1-, -3-, -4-, -5-, -6-, -7- and -8-sulphonic acid, 1-naphthylamine-2,4-, -2,5-, -2,7-, -2,8-, -3,5-, -3,6-, -3,7-, -3,8-, -4,6-, -4,7-, -4,8- and -5,8-disulphonic acid, 2-naphthylamine-1,5-, -1,6-, -1,7-, -3,6-, -3,7-, -4,7-, -4,8-, -5,7- and -6,8-disulphonic acid, 1-naphthylamine-2,4,6-, -2,4,7-, -2,5,7-, -3,5,7-, -3,6,8- and -4,6,8-trisulphonic acid, 2-naphthylamine-1,3,7-, -1,5,7-, -3,5,7-, -3,6,7-, -3,6,8- and -4,6,8-trisulphonic acid, 2-, 3- and 4-aminopyrimidine, 2-aminobenzothiazole, 5-, 6- and 8-amino-quinoline, 2-aminopyrimidine, morpholine, piperidine and piperazine, N-β-hydroxyethylaniline, semicarbazide, benzoic acid hydrazide, 4-(β-sulphatoethylsulphonyl)-aniline-3-(β-sulphatoethylsulphonyl)aniline, 4-amino-1-methoxybenzene-2-sulphonic acid, 4-amino-1-ethoxy-benzene-2-sulphonic acid, 4-aminophenol-6-sulphonic acid, 2-aminophenol-5-sulphonic acid, 4-aminotoluene-2-sulphonic acid, β-N-methylaminopropionitrile, β-aminopropionitrile and aminoacetic acid.

The new dyestuffs of the formula (1) are suitable for dyeing and printing hydroxyl- or amide-containing materials, such as textile fibres, filaments and fabrics made of wool, silk, nylon and polyurethane fibres and for producing wash-fast dyeings and prints on native or regenerated cellulose, the treatment of cellulose materials being advantageously carried out in the presence of acid-binding agents and if desired under heat using the methods disclosed for reactive dyestuffs.

The formulae shown are those of the corresponding free acids. The dyestuffs were generally isolated and used for dyeing in the form of the alkali metal salts, in particular the Na salts.

The weights given in the examples relate to the free acid. The numbers given in the examples to indicate the colour are indicator numbers fom the Colour Index hue indication chart.

The formulae given in the following examples relate in each case to one of the isomeric reaction products formed in the reaction, the position of the substituents in the two outer aromatic rings of the triphendioxazine system of the isomeric reaction products being subject to what was said under the formula (1a).

EXAMPLE 1

14.8 g of cyanuric fluoride are added dropwise to an ice-cold neutral solution of 17.3 g of o-sulphanilic acid in 400 ml of water in the course of 10 minutes during which the pH is maintained between 5.5 and 6.5 by simultaneously adding 15% strength sodium carbonate solution. After complete acylation, a suspension of 0.045 mole of the dyestuff of the formula

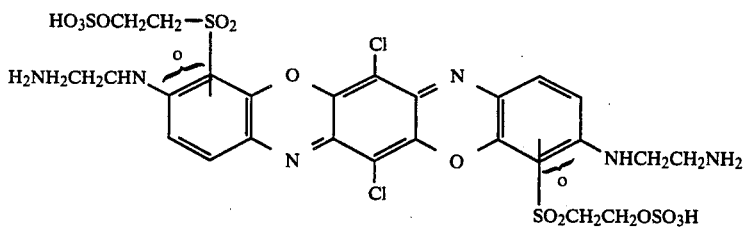

in 400 ml of water is added at 0°–5° C. By adding 2N sodium hydroxide solution the condensation is carried out at 0°–5° C. and pH 7.5–8.0. The dyestuff is salted out by adding 10 percent by volume of sodium chloride, is filtered off with suction, and is dried at 50°–60° C. in vacuo. Grinding produces a blue dyestuff powder which dyes cotton in brilliant blue shades (Hue Indicator No. 13). The dyestuff has the formula

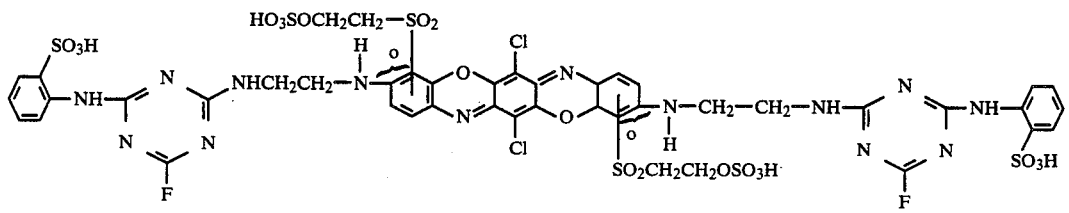

Diacylation of the above diaminotriphendioxazine dyestuff with 2 equivalents of the difluorotriazine compounds prepared from the amines listed below as described in Example 1 leads to further dyestuffs which dye cotton in brilliant blue shades (Hue Indicator No. 13).

TABLE 1
aniline-2,5-disulphonic acid
aniline-2,4-disulphonic acid
m-sulphanilic acid
p-sulphanilic acid
2-amino-toluene-5-sulphonic acid
2-amino-toluene-4-sulphonic acid
2-amino-anisole-5-sulphonic acid
2-amino-anisole-4-sulphonic acid
4-amino-anisole-3-sulphonic acid
4-amino-anisole-2-sulphonic acid
2-amino-1-chlorobenzene-4-sulphonic acid
2-amino-1-chlorobenzene-5-sulphonic acid
2-amino-naphthalene-1,5-disulphonic acid
1-amino-naphthalene-4,7-disulphonic acid
taurine
aminol sulphate
1-amino-4-methoxybenzene-2,5-disulphonic acid
1-amino-4-methylbenzene-2,5-disulphonic acid.

Using the procedure of the method described in Example 1 leads to further useful reactive dyestuffs which dye cotton in brilliant blue shades of Hue Indicator No. 14 if the starting materials used are the diaminotriphendioxazine dyestuffs listed hereinafter and the amine components mentioned in Example 1 and Table 1.

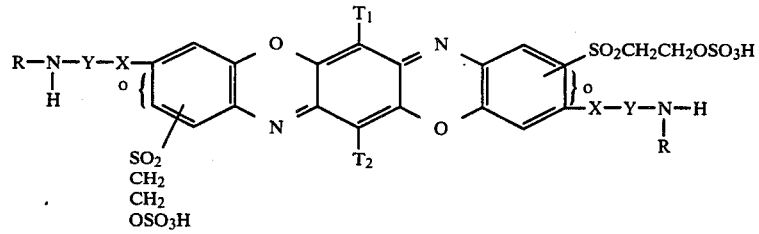

TABLE 2

| Example | $T_1$ | $T_2$ | $-X-Y-\underset{R}{N}-H$ |
|---|---|---|---|
| 1 | Cl | Cl | $-\underset{H}{N}-CH_2CH_2CH_2NH_2$ |
| 2 | Cl | Cl | $-\underset{H}{N}-CH_2-\underset{CH_3}{CH}-NH_2$ |
| 3 | Cl | Cl | $-\underset{H}{N}-(CH_2)_4-NH_2$ |
| 4 | Cl | Cl | $-\underset{H}{N}-(CH_2)_5-NH_2$ |
| 5 | Cl | Cl | $-\underset{H}{N}-(CH_2)_6-NH_2$ |
| 6 | Cl | Cl | $-\underset{H}{N}-\langle H \rangle-NH_2$ |
| 7 | Cl | Cl |  |
| 8 | Cl | Cl | $-\underset{H}{N}-CH_2-\underset{OSO_3H}{CH}-CH_2-NH_2$ |

TABLE 2-continued

| Example | T₁ | T₂ | —X—Y—N(R)—H |
|---|---|---|---|
| 9 | Cl | Cl | —O—CH₂CH₂—NH₂, bright red, Hue Indicator No. 10 |
| 10 | Cl | Cl | —N(H)—CH₂CH₂N(COCH₃)CH₂CH₂—NH₂ |
| 11 | Cl | Cl | —N(H)—CH₂CH₂OCH₂CH₂—NH₂ |
| 12 | Cl | Cl | —N(CH₃)—CH₂CH₂—N(CH₃)H |
| 13 | Br | Br | —N(H)—CH₂CH₂—NH₂ |
| 14 | Br | Br | —N(H)—CH₂CH₂CH₂—NH₂ |
| 15 | Br | Br | —N(H)—CH₂CH(CH₃)—NH₂ |
| 16 | Br | Br | —N(H)—(CH₂)₆—NH₂ |
| 17 | Br | Br | —N(CH₃)—CH₂CH₂—N(CH₃)H |
| 18 | CH₃ | CH₃ | —N(H)—CH₂CH₂—NH₂ |
| 19 | Cl | CH₃ | " |
| 20 | Br | CH₃ | " |
| 21 | OCH₃ | OCH₃ | " |
| 22 | H | Cl | " |
| 23 | H | Br | " |
| 24 | H | CH₂ | " |
| 25 | H | H | " |
| 26 | H | OCH₃ | " |
| 27 | | | 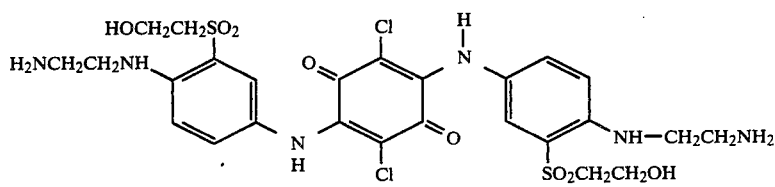 |

The diaminotriphendioxazine dyestuff used in Example 1 can be obtained by one of the three following methods:

(a) 34.55 g (0.05 mole) of the dianilide of the formula

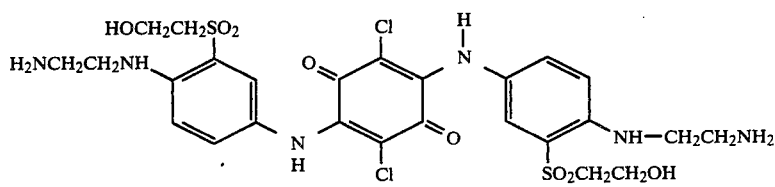

are introduced at 25° to 40° C. into 800 g of 25% strength oleum. The temperature is raised to 50°–60° C. in the course of 15 minutes, and the mixture is stirred until the cyclisation has ended (as can be monitored by thin layer chromatography). After cooling down to room temperature the mixture is discharged onto 2 kg of ice-water. The mixture is filtered with suction, and the paste on the filter is stirred into 1 l of ice-water. The pH is adjusted to 5–6 by sprinkling in sodium hydrogencarbonate. The precipitate is filtered off with suction and is washed with water. The dyestuff has the following formula

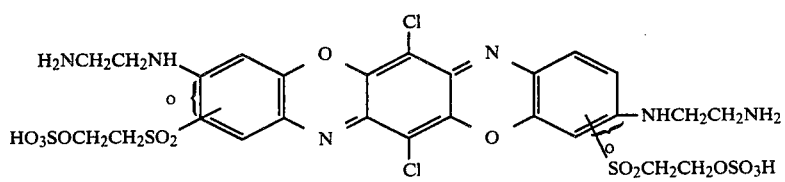

(b) 34.55 g of the dianilide are introduced with stirring at 20° to 25° C. into 400 g of 20% strength oleum in the course of 15 minutes. 22.8 g of ammonium persulphate are then added at 30° C. in 7 equal-size portions at one hour intervals. Afterwards the mixture is stirred at 20° to 30° C. for 1 hour. The reaction mixture is discharged onto 1 kg of ice-water. The further working-up procedure is as described in (a).

(c) 34.55 g of the dianilide are introduced at 20° to 30° C. with thorough stirring into a mixture of 80 ml of 20% strength and 60 ml of 65% strength oleum in the course of 40 minutes. 1 g of potassium iodide is added at 20° C. The mixture is stirred at 20° C. to 23° C. for 45 minutes, and the melt is then added to 1000 g of ice and 200 ml of water, so that the temperature does not rise above 10° C. The further working-up procedure is as described in (a). The dyestuff has the formula shown in Example a.

The dianilide used as a starting material in Examples a, b and c can be prepared in conventional manner as follows:

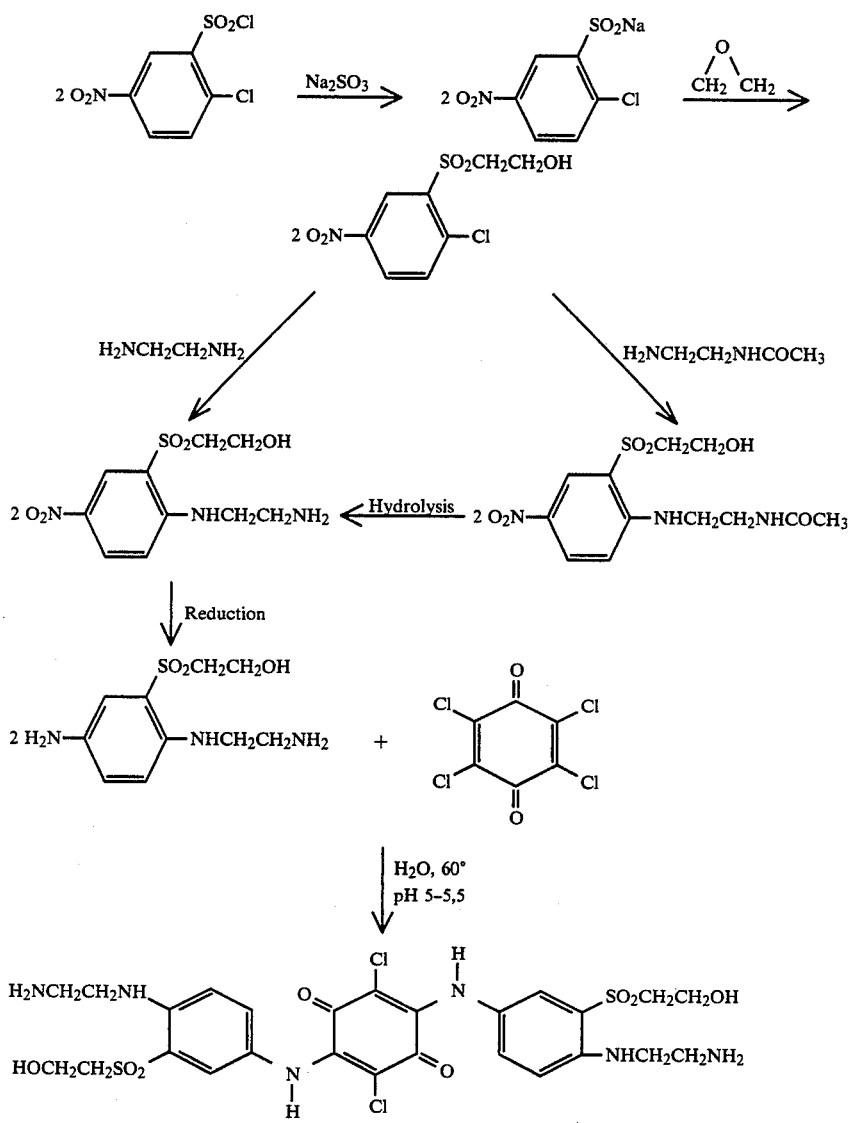

EXAMPLE 2

110.3 g of the triphendioxazine dyestuff of the formula

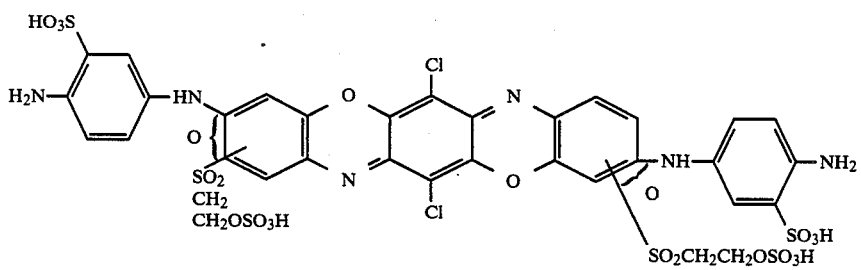

are dissolved in 2 l of ice-water under neutral conditions. 27 g of trifluorotriazine are added dropwise at 0° C. in the course of 20 minutes during which the pH is maintained between 5.5 and 6.5 by the simultaneous addition of dilute sodium carbonate solution. After the acylation has ended (if free amino groups are still present, a little more trifluorotriazine is added), a neutral solution of 34.6 g of m-sulphanilic acid in 100 ml of water is added, the hydrofluoric acid which is liberated being neutralised with dilute sodium carbonate solution (pH 6-7), while the temperature is allowed to rise to 10°-15° C. The dyestuff is salted out by adding 20% by volume of sodium chloride. Filtering with suction, drying at 60° C. in a vacuum drying cabinet and grinding produce a blue dyestuff powder which dyes cotton in brilliant blue shades (Hue Indicator No. 14). The dyestuff has the formula

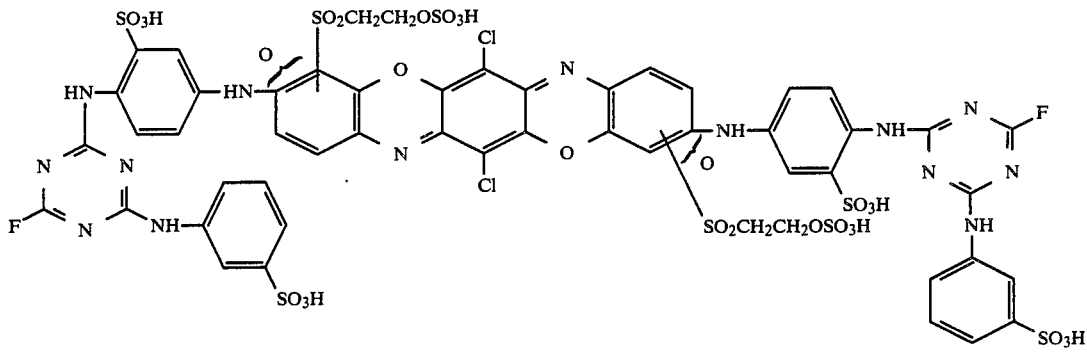

Using the procedure of this example leads to further useful dyestuffs which dye cotton in brilliant blue shades of Hue Indicator No. 14 if the m-sulphanilic acid used in this example is replaced by an equivalent amount of the amines listed below.

TABLE 1 ammonia
taurine
N—methyltaurine
aminosulphate
ethanolamine
diethanolamine
methylamine
diethylamine
p-sulphanilic acid
1-amino-4-methoxybenzene-3-sulphonic acid
1-amino-4-methylbenzene-3-sulphonic acid
1-amino-4-ethoxybenzene-3-sulphonic acid
N—methylaniline
N—ethylaniline
N—β-hydroxyethylaniline
1-amino-2-methylbenzene-4-sulphonic acid
1-amino-2-chlorobenzene-4-sulphonic acid
1-amino-2-chlorobenzene-5-sulphonic acid
o-sulphanilic acid
1-amino-2-methoxybenzene-4-sulphonic acid
1-amino-2-methoxybenzene-5-sulphonic acid
1-amino-2-methoxy-5-methylbenzene-4-sulphonic acid
semicarbazide.

Using the procedure of the method described in Example 2 leads to further useful reactive dyestuffs which dye cotton in brilliant blue shades (Hue Indicator No. 14) if the starting material used in the diaminotriphendioxazine dyestuffs listed hereinafter and the amine components mentioned in Table 1 of Example 2.

TABLE 2

| Example | $T_1$ | $T_2$ | $-X-Y-N-H$ <br> $\quad\quad\quad R$ |
|---------|-------|-------|------|
| 1 | Cl | Cl | 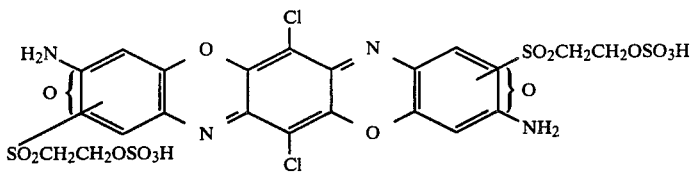 |
| 2 | Br | Br | " |
| 3 | H | H | " |
| 4 | $CH_3$ | $CH_3$ | " |
| 5 | $CH_3$ | $CH_3$ | " |
| 6 | $OCH_3$ | $OCH_3$ | " |

Further useful dyestuffs which dye cotton in brilliant blue shades are obtained if 2,4,6-trifluorotriazine is replaced by an equivalent amount of 2,4,6-trichlorotriazine as used in Examples 1 and 2 and if the reaction conditions are modified in such a way as known in the literature for the reaction with 2,4,6-trichlorotriazine and the diaminotriphendioxazines and amine components mentioned in respectively Table 1 and Table 2 of Examples 1 and 2 are used.

EXAMPLE 3

0.1 mole of the triphendioxazine dyestuff of the formula

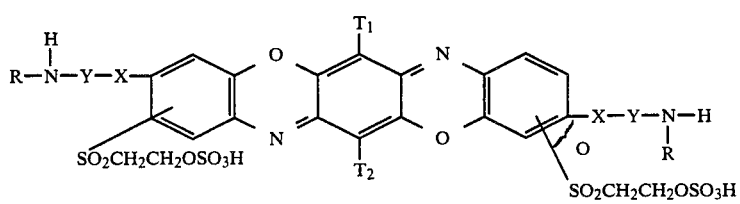

(prepared analogously to Example 1a, 1b or 1c) is dissolved at pH 5.5 in 2 l of ice-water. 0.11 mole of trifluorotriazine is added dropwise at 0° in the course of 20 minutes during which the pH is maintained between 5.5 and 6.5 by the simultaneous addition of dilute sodium carbonate solution. After the monoacylation has ended, a neutral solution of 0.1 mole of m-sulphanilic acid in 100 ml of water is added, the hydrofluoric acid which is liberated being neutralised with dilute sodium carbonate solution (pH 5.5-6.5) and the temperature being allowed to rise to 15°-20° C. The dyestuff is salted out by adding 20% by volume of sodium chloride. Filtering off with suction, drying at 60° in a vacuum drying cabinet and grinding produce a blue dyestuff powder which dyes cotton in bright reddish blue shades (Hue Indicator No. 13). The dyestuff has the formula

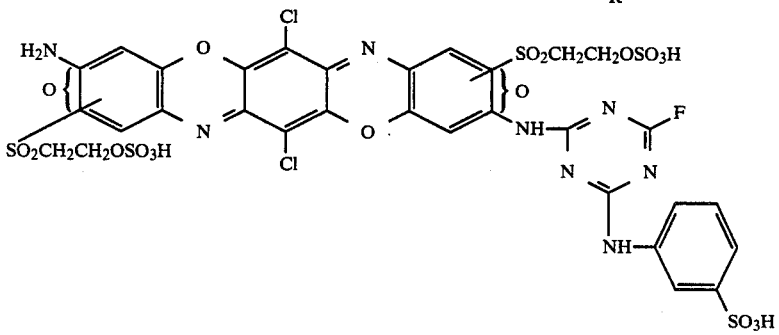

Using the procedure of this example leads to further useful dyestuffs which dye cotton in brilliant blue shades of Hue Indicator No. 13 if the m-sulphanilic acid used in this example is replaced by an equivalent amount of the amines listed below.

TABLE 1 ammonia
taurine
N—methyltaurine
aminosulphate
ethanolamine
diethanolamine
methylamine
diethylamine
p-sulphanilic acid
1-amino-4-methoxybenzene-3-sulphonic acid
1-amino-4-methylbenzene-3-sulphonic acid
1-amino-4-ethoxybenzene-3-sulphonic acid
N—methylaniline
N—ethylaniline
N—β-hydroxyethylaniline
1-amino-2-methylbenzene-4-sulphonic acid
1-amino-2-chlorobenzene-4-sulphonic acid
1-amino-2-chlorobenzene-5-sulphonic acid
o-sulphanilic acid
1-amino-2-methoxybenzene-4-sulphonic acid
1-amino-2-methoxybenzene-5-sulphonic acid
1-amino-2-methoxy-5-methylbenzene-4-sulphonic acid
semicarbazide.

We claim:

1. A dyestuff of the formula

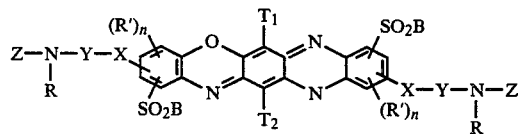

wherein
$B = CH=CH_2$ or $CH_2CH_2W$,
wherein
$W$ = detachable group, selected from the group consisting of $OSO_3H$, $Cl$, $S_2O_3H$, $OCOCH_3$, $OPO_3H_2$ and $—N(CH_3)_3$,
$R$ = H or $C_1$-$C_4$-alkyl optionally substituted by OH, $OCH_3$, COOH or $SO_3H$,
$Z$ = reactive group or H,
$T_1$ and $T_2$ stand for H, Cl, Br, $C_1$-$C_4$-alkoxy, $C_1$-$C_4$-alkyl, optionally substituted phenyl or phenoxy, each optionally substituted by Cl, $CH_3$, $C_2H_5$, $OCH_3$ or $OC_2H_5$,
X stands for O, S or $$\underset{R''}{\overset{|}{N}},$$

Y stands for phenylene optionally substituted by $SO_3H$, $CH_3$ or COOH,

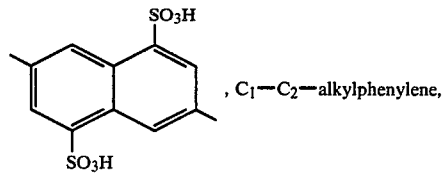, $C_1$—$C_2$—alkylphenylene,

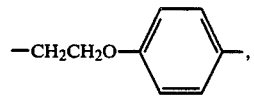, cyclohexylene, in aliphatic hydrocarbon radical optionally substituted by phenyl $—SO_3H$, COOH, $COCH_3$ or $OSO_3H$ or an aliphatic hydrocarbon radical interrupted by an oxygen or sulfur atom, N—H or $NCOCH_3$ or
X and Y together stand for a direct bond or $$\underset{R}{\overset{|}{-N-}},$$

R' stands for Cl, Br, $SO_3H$, $C_1$-$C_4$-alkyl, $C_1$-$C_4$-alkoxy or COOH,
R" stands for hydrogen or $C_1$-$C_4$-alkyl and in the event that Y denotes an optionally substituted divalent aliphatic radical together with R also stands for alkylene, n denotes 0 or 1 and wherein the radical $SO_2B$ is in ortho-position relative to the substituent $$-X-Y-\underset{R}{\overset{|}{N}}-Z$$

2. Dyestuffs of claim 1 wherein at least one Z radical stands for a reactive group.

3. Dyestuffs of claim 1, wherein —X—Y— stands for a direct bond and one Z substituent stands for a reactive group and the other Z substituent stands for hydrogen.

4. Dyestuffs of claim 1 of the formula

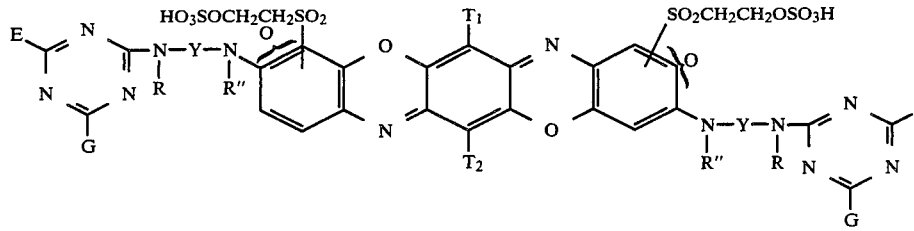

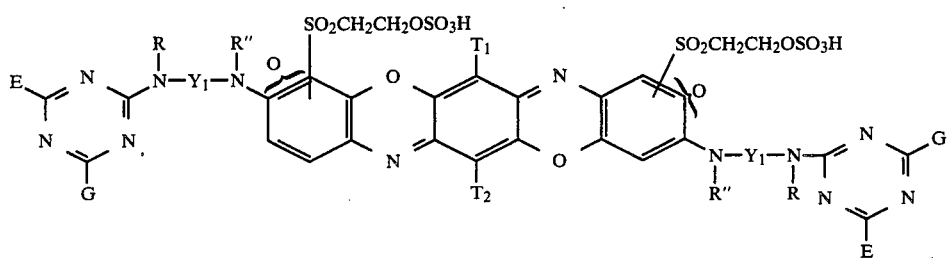

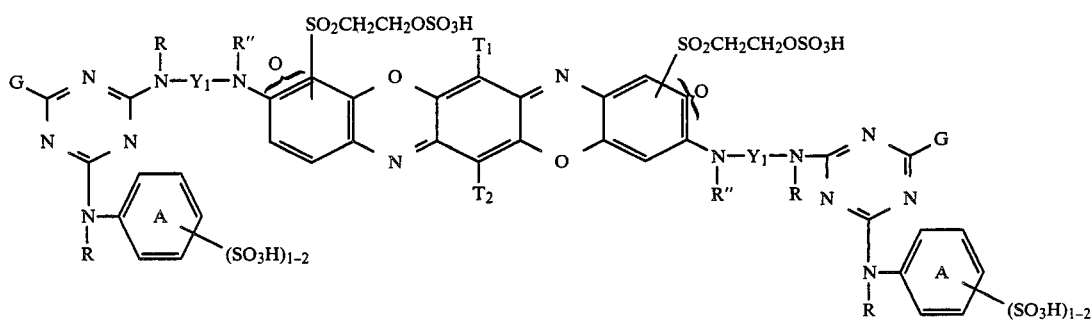

wherein
E = optionally substituted amino group
G = F or Cl
$Y_1$ = aliphatic radical,

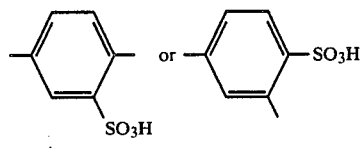

and the benzene rings A are further optionally substituted by Cl, $CH_3$, $OCH_3$, COOH and $T_1$, $T_2$, R", Y and R are as defined in claim 1.

5. Dyestuffs of claim 4 where
$Y_1 = (CH_2)_{2-4}$ or $-CH_2-CH-CH_3$ and
G = F.

6. Dyestuffs of claims 5 or 6 where
R and R" = H.

7. Dyestuffs of the formula

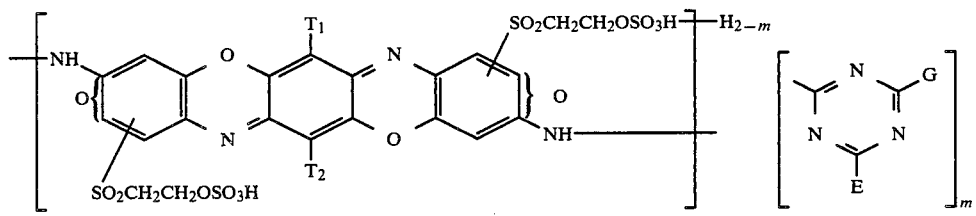

wherein
$T_1$ and $T_2$ stand for H, Cl, Br, $C_1$-$C_4$ alkoxy, $C_{1-4}$ alkyl, optionally substituted phenyl or phenoxy, each optionally substituted by Cl, $CH_3$, $C_2H_5$, $OCH_3$ or $OC_2H_5$,
E is an optionally substituted amino group,
G is F or Cl, and m is 1 or 2.

* * * * *